Oct. 4, 1932.  C. C. FARMER  1,880,957
ELECTRIC TRAIN WIRE COUPLING
Filed April 4, 1930
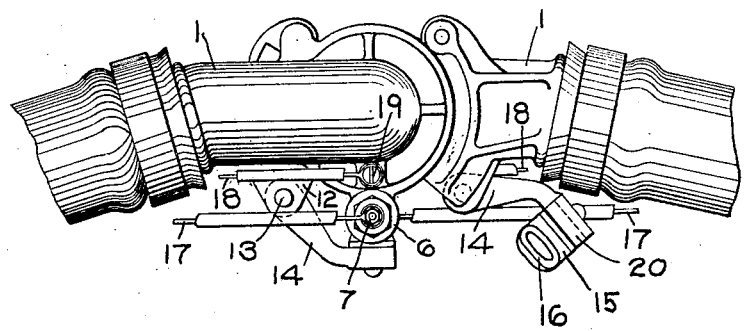
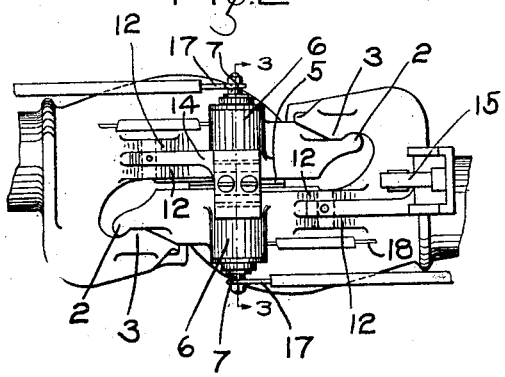  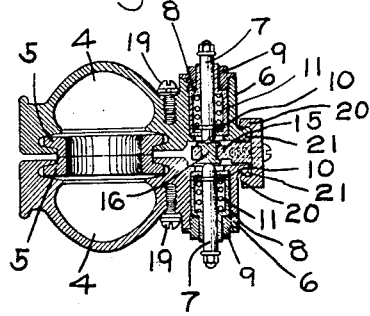
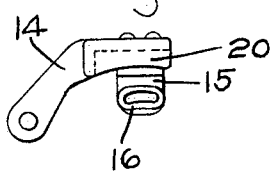
INVENTOR
CLYDE C. FARMER
BY *Wm. M. Cady*
ATTORNEY Patented Oct. 4, 1932

1,880,957

UNITED STATES PATENT OFFICE

CLYDE C. FARMER, OF PITTSBURGH, PENNSYLVANIA, ASSIGNOR TO THE WESTINGHOUSE AIR BRAKE COMPANY, OF WILMERDING, PENNSYLVANIA, A CORPORATION OF PENNSYLVANIA

ELECTRIC TRAIN WIRE COUPLING

Application filed April 4, 1930. Serial No. 441,699.

This invention relates to hand operated hose couplings of the type employed to connect fluid conducting train pipes between cars of a train and in which means are provided for connecting electric train wires when the hose couplings are coupled together.

One object of my invention is to provide electric train wire connectors for a hose coupling in which the train wire connections are effected after the hose couplings are coupled together, so that in coupling up the hose couplings, the coupling action will not be opposed by the force required to connect the train wire contacts in the coupling.

Another object of my invention is to provide a hose coupling having a movable contact member which is adapted to be operated after counterpart hose couplings are coupled together to effect the closure of an electric train line circuit through the couplings.

Another object of my invention is to provide an electric train line connector for hose couplings, in which there is a wiping action as the contacts of counterpart hose couplings are connected together, so as to maintain the contacts bright and clean.

Another object of my invention is to provide a combined hose and electric train wire coupling, in which means are provided for preventing a cocking or distortion of the hose coupling gaskets due to the spring pressure exerted by the electric train wire contacts when in engagement.

The above and other objects and advantages of the invention will appear in the following more detailed description of the invention.

In the accompanying drawing; Fig. 1 is a side elevation of counterpart hand operated hose couplings, shown coupled together, and embodying my improved means for connecting an electric train wire circuit through the coupling heads; Fig. 2 a plan view of the construction shown in Fig. 1; Fig. 3 a section on the line 3—3 of Fig. 2, and Fig. 4 a detail view of the movable contact arm.

The hand operated hose coupling shown in the drawing is of the type commonly employed to connect the flexible train pipe hose between cars of a train and comprising a coupling head 1 provided with locking ribs 2 and 3 adapted upon rotative movement of the head to interlock with corresponding ribs of a counterpart coupling head. The fluid conduit 4 of the head has an outlet opening in which is mounted a flexible gasket 5 adapted to engage a corresponding gasket of a counterpart coupling head when heads are coupled together.

According to my invention, a lug 6 is cast on the coupling head at one side and said lug is provided with a cylindrical chamber containing an electric contact member 7. The contact member is mounted in a cylindrical cage 8 of insulation, the cage being disposed in the chamber of the lug and being clamped in place by a nut 9. The contact member 7 is provided with a collar 10, which is engaged by a coil spring. The spring urges the contact member outwardly, and the outward movement is limited by engagement of the collar 10 with an end wall of the cage 8.

Spaced ears 12 are also cast on the coupling head at one side, and mounted between said ears on a pivot pin 13 is an arm 14, to the other end of which is secured a block of insulation 15, and carried by said block is a contact member 16.

The arm 14 is so positioned that when rotated on its pivot pin 13, the contact member 16 will be forced between the ends of the contact member 7 of the coupling heads, when coupled together. The contact member 7 is connected to a train wire 17, and an additional or return train wire 18 may be connected to the coupling head by a screw 19.

When a coupling head is not coupled with a counterpart head, the arm 14 is positioned as shown on the right hand coupling head in Fig. 1. After coupling heads are coupled together, as shown in Fig. 1, one or the other arms 14 is rotated, so as to cause the contact member 16 to engage between the contact members 7 of the coupled heads, as shown in Fig. 3, thus closing the train line circuit through the train wire 17.

The arm 14 is provided with slightly hooked flanges 20, adapted to be sprung over counterpart ribs 21 carried by the coupling heads, so that the arm 14 is locked in place and is prevented from moving out of its contact engaging position by the locking engagement between the flanges and the ribs.

The contact face of the contact member 16 is elongated, as shown in Fig. 4, so as to permit of a turning movement of the coupling heads, without disengaging the contact members, and the contact member 16 is also dished out on opposite sides, to enable the spring contact members 7 to assist in holding the contact member 16 in place, after it is once inserted.

It will be noted that when coupling heads are coupled together and before an arm 14 is shifted to its contact position, the inner movement of the contact member 7 is limited by engagement of the collar 10 with the end wall of the cage 8, so that only a relatively slight displacement movement of the contact members 7 is required, when the contact member 16 is snapped into its contacting position.

Two train line circuits are provided with the above described construction, one through the coupling head, to which the train wire 18 is connected by screw 19, and the other by way of the contact members 7 and the train wire 17.

While one illustrative embodiment of the invention has been described in detail, it is not my intention to limit its scope to this embodiment or otherwise than by the terms of the appended claims.

Having now described my invention, what I claim as new and desire to secure by Letters Patent, is:

1. The combination with a hose coupling head adapted to be manually coupled to a counterpart head, of a contact member carried by said head and spaced from the contact member of a counterpart head with the heads in coupled position, and a movable contact adapted to be manually shifted to a position for connecting the contact members of counterpart coupling heads, when the heads are in coupled position.

2. The combination with a hose coupling head adapted to be manually coupled to a counterpart head, of a contact member carried by said head, a movable arm mounted on said head, and a contact carried by and movable with said arm to connect the contact members of counterpart coupling heads, when the heads are in coupled position.

3. The combination with a hose coupling head adapted to be coupled to a counterpart head, of a lug carried at one side of said head, a contact member mounted in said lug and arranged to remain out of engagement with the corresponding contact member of a counterpart head, when the heads are in coupled position, and a manually movable contact carried by said head and operable when coupling heads are in the coupled position, to connect the contact members of the counterpart coupling heads.

4. The combination with a hose coupling head, of a yielding contact member carried by said head, and a contact arm pivotally mounted on said head and provided with contact means and movable, after counterpart coupling heads have been coupled together, to connect the contact members of said counterpart heads.

5. The combination with a hose coupling head, of a contact member carried by said head, a movable arm having a contact adapted, upon operation of said arm to connect the contact members of counterpart coupling heads when the heads are in coupled position, and means carried by said arm for holding the counterpart heads together when the arm is operated to connect said contact members.

6. The combination with a hose coupling head, of a contact member carried by said head, a movable arm having a contact adapted, upon operation of said arm to connect the contact members of counterpart coupling heads when the heads are in coupled position, a lug carried by the coupling head, and flanges carried by said arm for engaging the lugs of counterpart coupling heads, upon movement of the arm to connect said contact members, to thereby hold said coupling heads together.

In testimony whereof I have hereunto set my hand, this 29th day of March, 1930.

CLYDE C. FARMER.